US012536734B2

(12) United States Patent
Price et al.

(10) Patent No.: US 12,536,734 B2
(45) Date of Patent: Jan. 27, 2026

(54) DYNAMIC FOVEATED POINT CLOUD RENDERING SYSTEM

(71) Applicant: United States of America as represented by the Secretary of the Navy, San Diego, CA (US)

(72) Inventors: Garrison B. Price, San Diego, CA (US); Fred W. Greene, San Diego, CA (US); Mark Bilinski, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 222 days.

(21) Appl. No.: 18/193,076

(22) Filed: Mar. 30, 2023

(65) Prior Publication Data

US 2024/0331270 A1    Oct. 3, 2024

(51) Int. Cl.
*G06T 15/20*    (2011.01)

(52) U.S. Cl.
CPC .................. *G06T 15/20* (2013.01)

(58) Field of Classification Search
CPC ............. G06T 15/20; G06T 15/00; G06T 2207/10028; G06T 15/10
See application file for complete search history.

(56) References Cited

U.S. PATENT DOCUMENTS

| | | | | |
|---|---|---|---|---|
| 7,737,973 B2* | 6/2010 | Wheeler | ................ | G06T 15/02 345/426 |
| 7,804,498 B1* | 9/2010 | Graham | ................ | G06T 11/206 345/419 |
| 8,884,974 B2* | 11/2014 | Dadi | ................ | G06T 1/20 345/522 |
| 9,720,497 B2* | 8/2017 | Jang | ................ | G06F 3/013 |
| 10,552,690 B2* | 2/2020 | Schubert | ................ | G06T 11/00 |
| 10,776,989 B1* | 9/2020 | Douglas | ................ | G16H 30/40 |
| 11,523,135 B2* | 12/2022 | Aflaki Beni | ......... | H04N 19/167 |
| 11,587,273 B2* | 2/2023 | Surti | ................ | G06T 11/40 |
| 11,676,328 B1* | 6/2023 | Baize | ................ | G06T 15/20 345/426 |

(Continued)

FOREIGN PATENT DOCUMENTS

| KR | 20150034804 A | * | 4/2015 | |
|---|---|---|---|---|
| WO | WO-2021043136 A1 | * | 3/2021 | ............... G06T 3/06 |

OTHER PUBLICATIONS

Unity. Renderer and Material Priority. Aug. 3, 2022 [Date from Wayback Machine. Retrieved on Nov. 3, 2025]. Retrieved from the Internet: <URL: https://docs.unity3d.com/Packages/com.unity.render-pipelines.high-definition@9.0/manual/Renderer-And-Material-Priority.html > (Year: 2022).*

(Continued)

*Primary Examiner* — King Y Poon
*Assistant Examiner* — Michelle Hau Ma
(74) *Attorney, Agent, or Firm* — Naval Information Warfare Center, Pacific; Kyle Eppele; Paul C. Oestreich

(57) ABSTRACT

A rendering system that includes at least one processor configured to receive a plurality of data points, receive at least one priority assignment, assign at least one priority value to the plurality of data points based on the at least one priority assignment, and render the plurality of data points based on the at least one priority value.

16 Claims, 4 Drawing Sheets

(56) References Cited

U.S. PATENT DOCUMENTS

| | | | |
|---|---|---|---|
| 11,756,248 B2* | 9/2023 | Fukuya | G06T 11/40 |
| | | | 345/581 |
| 12,307,072 B2* | 5/2025 | Gupta | G06F 3/0484 |
| 2003/0128210 A1* | 7/2003 | Muffler | G06T 15/20 |
| | | | 345/428 |
| 2006/0001681 A1* | 1/2006 | Smith | G06T 15/503 |
| | | | 345/629 |
| 2020/0117903 A1* | 4/2020 | Goel | G06V 20/35 |
| 2020/0304865 A1* | 9/2020 | Yea | H04L 65/75 |
| 2023/0065943 A1* | 3/2023 | Fukuya | G06T 11/40 |

OTHER PUBLICATIONS

Markus Schütz; Katharina Krösl; Michael Wimmer; Real-Time Continuous Level of Detail Rendering of Point Clouds; 2019 IEEE Conference on Virtual Reality and 3D User Interfaces (VR); Mar. 2019.

* cited by examiner

DYNAMIC FOVEATED POINT CLOUD RENDERING SYSTEM

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 112200) is assigned to the United States Government and is available for licensing for commercial purposes. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil.

BACKGROUND OF THE INVENTION

Rendering dense point clouds is very computationally intensive as every point is rendered individually. However, the higher the density of the point cloud, the better fidelity there is for a viewer. Current techniques for rendering dense point clouds involve identifying the points that are visible in the total frustum of the camera and only loading and rendering points in that area. While these techniques simplify computation relative to all possible viewing angles, they still can require intensive resource usage. A user's eyes only focus on a small portion of the screen at once and the points that are loaded and rendered outside of this small area are not as important for view. What is needed is a more efficient method for reducing the computational load of point cloud rendering.

SUMMARY OF THE INVENTION

The present invention relates to a method of dynamic foveated point cloud rendering.

According to an illustrative embodiment of the present disclosure, a rendering system includes at least one processor configured to receive a plurality of data points, receive at least one priority assignment, assign at least one priority value to the plurality of data points based on the at least one priority assignment, and render the plurality of data points based on the at least one priority value.

According to a further illustrative embodiment of the present disclosure, a rendering method includes receiving a plurality of data points, receiving at least one priority assignment, assigning at least one priority value to the plurality of data points based on the at least one priority assignment, and rendering the plurality of data based on the at least one priority value.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Throughout the several views, like elements are referenced using like references. The elements in the figures are not drawn to scale and some dimensions are exaggerated for clarity.

The detailed description of the invention particularly refers to the accompanying figures in which.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
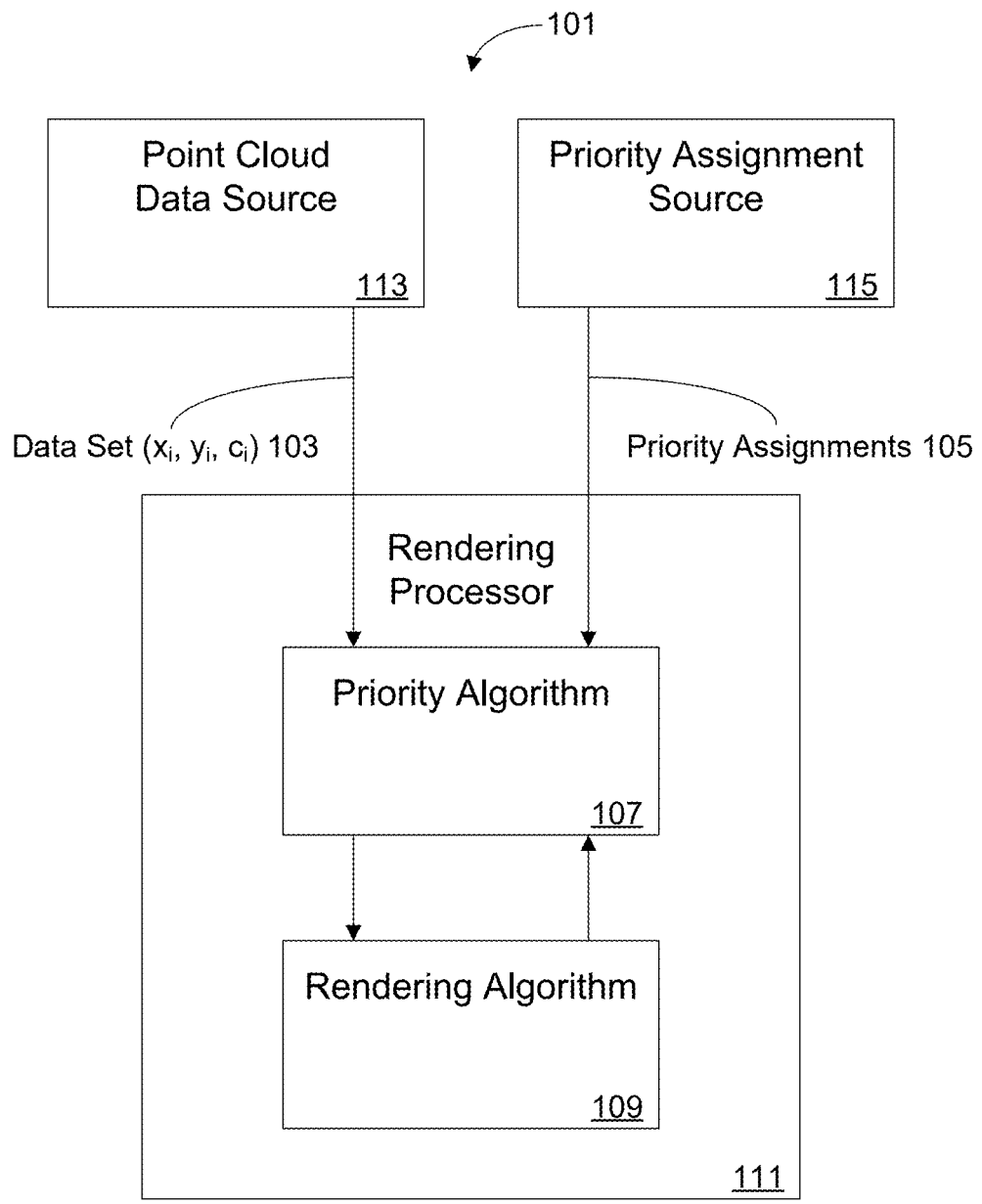
FIG. 1 shows a flow diagram of an exemplary rendering system.

FIG. 1 shows a flow diagram of an exemplary rendering system 101. The system can use two primary inputs, data points 103, from point cloud data source 113 and priority assignments 105, from priority assignment source 115. Data points 103 can include a plurality of individual points each with corresponding positional ($x_i$, $y_i$), and color data ($c_i$). Data points 103 can be supplied from previously recorded data. Data points 103 can be supplied in real-time by a camera system to allow contemporaneous remote viewing/navigation of a space. Priority assignments 105 can include any feature (e.g., distance from user, angle from eye-line/fovea, colors, color contrast, brightness, objects, etc.) that a user or system wants rendered at a specific level of detail. For example, priority assignments 105 can include any point within a predetermined distance (e.g., the effective rendering distance of the hardware) of the user and within a predetermined angle of the user's eye-line/fovea (e.g., within 20 degrees). Points matching these criteria will be prioritized for higher fidelity rendering. As another example, an external priority assignment source (e.g., a safety system) can be configured to automatically pull a list of hazards from a database and identify features correlating to the hazards. Each feature can be assigned any number of differing priority levels depending on various factors (e.g., likelihood of negative event occurring, severity of impact, difficulty of detection, etc.). When the system 101 runs, the source can supply the features as priority assignments 105 for priority algorithm 107. In another example combining the previous two examples, an exemplary system can prioritize rendering points within the user's eye-line, and within that eye-line prioritize rendering the hazard features. Priority algorithm 107 can assign priorities to various locations within the virtual environment and then pass the priorities to rendering algorithm 109. Rendering algorithm 109 uses the priorities to render particular points with more or less detail. In at least some examples, rendering algorithm 109 can have inputs for priority algorithm 107. It will be understood that priority algorithm 107 and rendering algorithm 109 may be implemented in computer-readable instructions (software) executed by one or more processors 111 (one shown in FIG. 1) as known to one of ordinary skill in the art.

For example, if rendering processing capacity is insufficient to render all features at the specified level of detail, rendering algorithm 109 can notify priority algorithm 107 of the lack of resources. Priority algorithm 107 can then readjust the priorities and send a new priorities to rendering algorithm 109. This readjustment sequence can occur more than once. Exemplary systems can use an additive approach, wherein universally minimal rendering is used as a starting point and then rendering detail is added with each cycle of communication between priority algorithm 107 and rendering algorithm 109. Once no more processing power is available for rendering, the communication loop ends. Exemplary systems can pre-filter the data points 103 such that the priority algorithm 107 assigns each data point a priority value based on the priority assignments 105. The pre-filtered data points are then sent to the rendering algorithm where they are rendered according to their pre-filtered priorities and further cycles are not required. Exemplary systems can combine the additive and pre-filter approaches by pre-filtering for certain priorities between each communication cycle and adding to the rendering load until a predetermined threshold is met (e.g., insufficient processing capacity remains to render additional detail).

In exemplary methods, the data points 105 can be a point cloud stored in a spatially ordered tree structure (e.g., an octree) with a defined index to efficiently traverse the tree. The leaf nodes in the tree are individual points with position and color information. The non-leaf nodes, or inner nodes, of the tree contain references to leaf children as well as the bounding volume that encapsulate the leaf children in 3D space.

Figure 2:
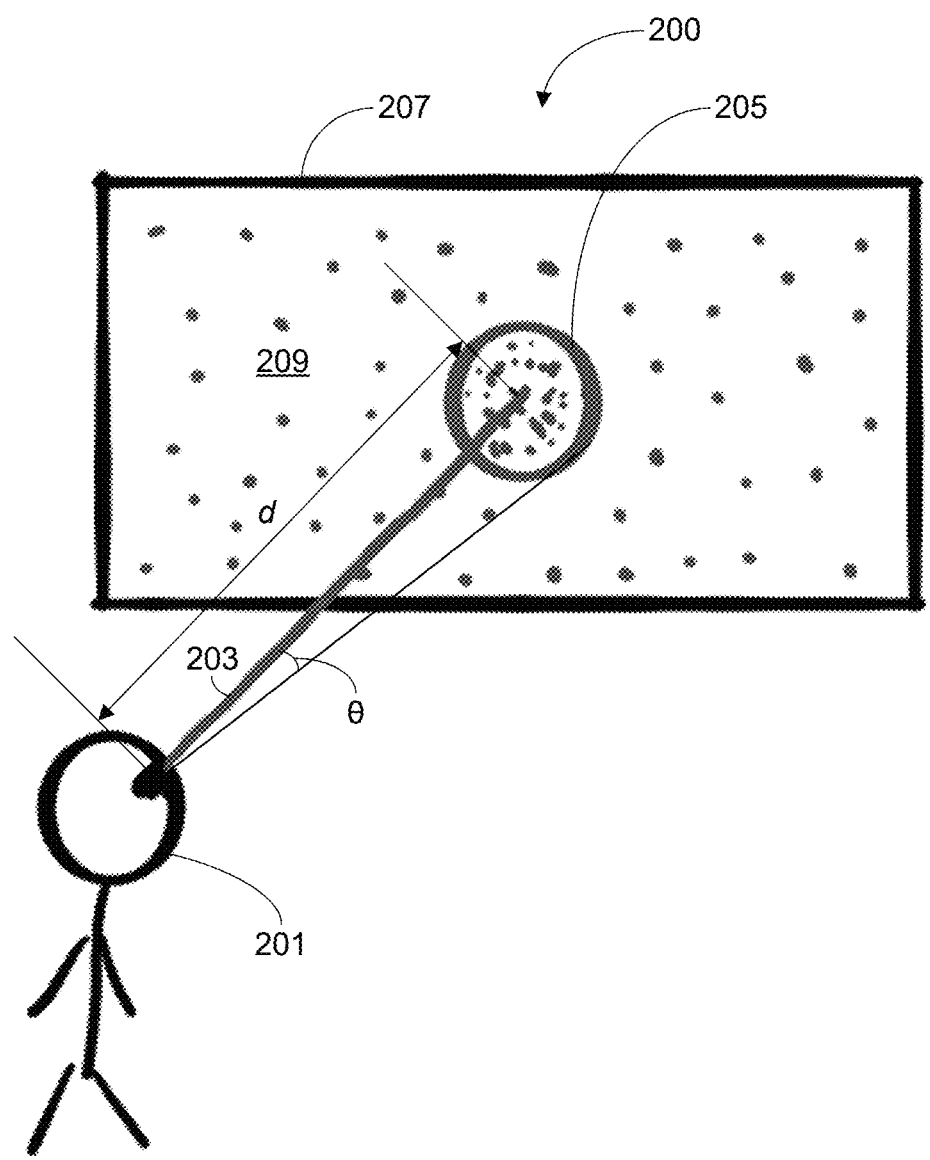
FIG. 2 shows an exemplary system rendering a 2D space.

FIG. 2 shows an exemplary system 200 rendering a 2D space 209, including a user 201, user's line of sight 203, and region 205 within a field of view 207 into the 2D space and falling with predetermined angle, θ, from the user's line of sight 203 having length, or distance, d, from user 201. While 2D rendering is less resource intensive, exemplary systems can still be used for prioritizing particular rendering targets.

Figure 3:
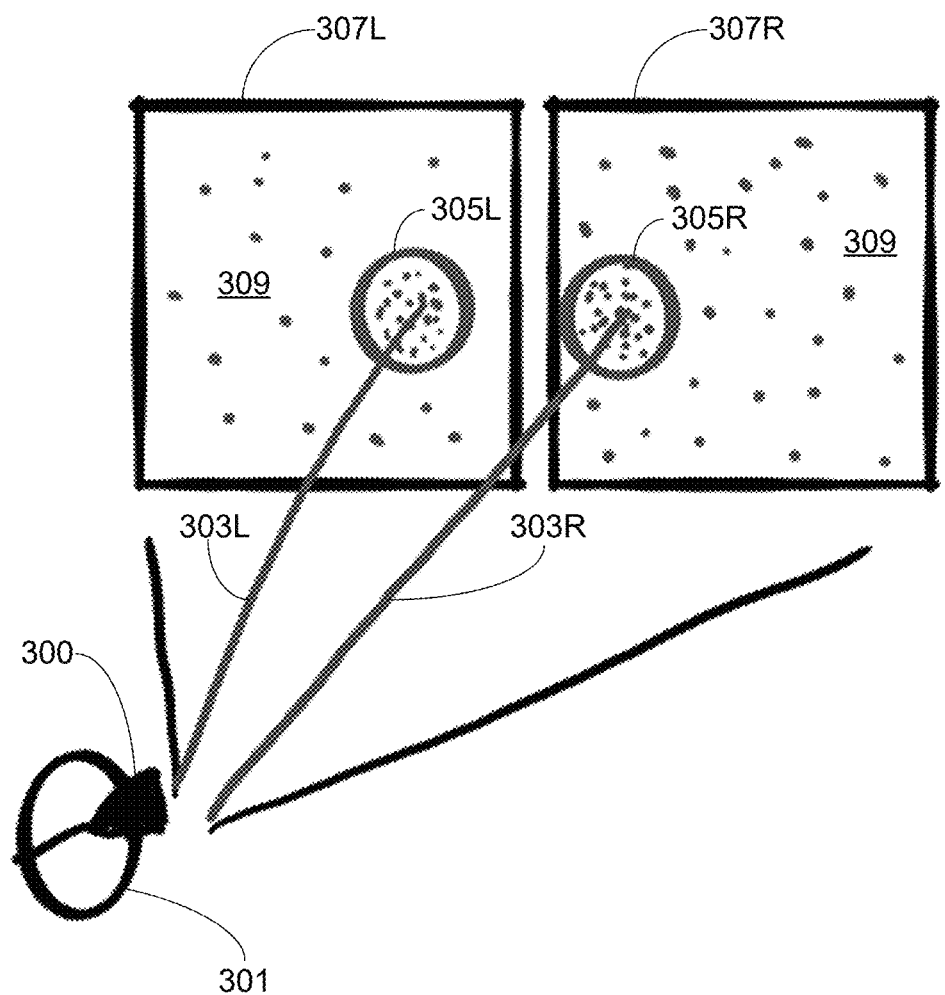
FIG. 3 shows an exemplary system rendering a 3D space.

FIG. 3 shows an exemplary system 300 rendering a 3D space 309, including a user 301, user's left 303L and right 303R lines of sight from the user's eyes, left 305L and right 306R regions within corresponding left 307L and right 307R fields of view Each region 305L, 305R corresponds to 3D data points at a focal point of the user's eyes and also those data points falling within a predetermined angle (see angle, θ, in FIG. 2) from the lines of sight 303L, 303R as analogous to the 2D space described above. Note that the distance (see distance, d, in FIG. 2) from the user's eyes to the focal point along the lines of sign 303L, 303R, in the point cloud may be beyond the surface of the screens rendering fields of view 307L, 307R and varies depending on the user's focus. Two 3D vectors can be computed from the data the eye tracking system provides. These vectors are in the coordinate space of the virtual world and represent the direction and position of the user's eyes within the virtual space. For simplification and as a further optimization step, some systems could derive a single vector to represent these two eye-view-vectors at the expense of fidelity. This could, for example, average the positions and directions of the actual eye-view-vectors. The eye tracking data also allows a focal depth to be calculated. This is where the two eye-view-vectors converge and indicates how far forward the user is looking (i.e., the focal point).

Exemplary systems use the eye-tracking data to efficiently access the data stored in the tree and reduce loading and rendering times. At a high level, any points contained in bounding volumes defined within the tree structure that are intersected by the eye-view-vectors contain points that are more important to visualize while bounding volumes outside those vectors are less important. Similarly, points contained in bounding volumes further than the focal point are less important. A priority assignment algorithm will assign priorities to various levels of inner nodes of the tree based on the intersection. The priority of a given inner node can vary depending on what criteria the particular priority assignment algorithm uses. The most simplistic method would be reducing the priority based on the linear distance from the eye-view-vectors. A more effective solution would use a non-linear assignment based on the fidelity sensing capabilities of the human eye.

Once priorities of the bounding volumes have been assigned, the system can use this data to load points within these volumes only up to the level of detail associated with the priority. Methods for determining the priority to detail-level determination can vary. Optimizations can be made that take into account depth of non-leaf nodes, general point density, available system resources, etc. Other systems can be combined that add/subtract priority to specific volumes depending on the application. For example, specific points of interest can be forced to always render in higher detail. Based on these priorities, the detailed point data is loaded from slow, long-term storage (e.g., a hard drive) into smaller, faster memory (e.g., RAM/GPU RAM). A rendering algorithm then takes the priorities of the volumes and renders the points accordingly. The rendering algorithm may use more data other than just the priority to determine how the specific leaf-node points are rendered, such as distance from camera, focal point, etc. This results in a system that dynamically loads and renders high-resolution point-cloud data only where the user is looking. Data is loaded/rendered at a decreased resolution outside the central vision. This dramatically decreases demand on the system rendering points the user cannot perceive, thus increasing the capability of increasing the resolution of what the user is seeing without negatively affecting the experience.

Figure 4:
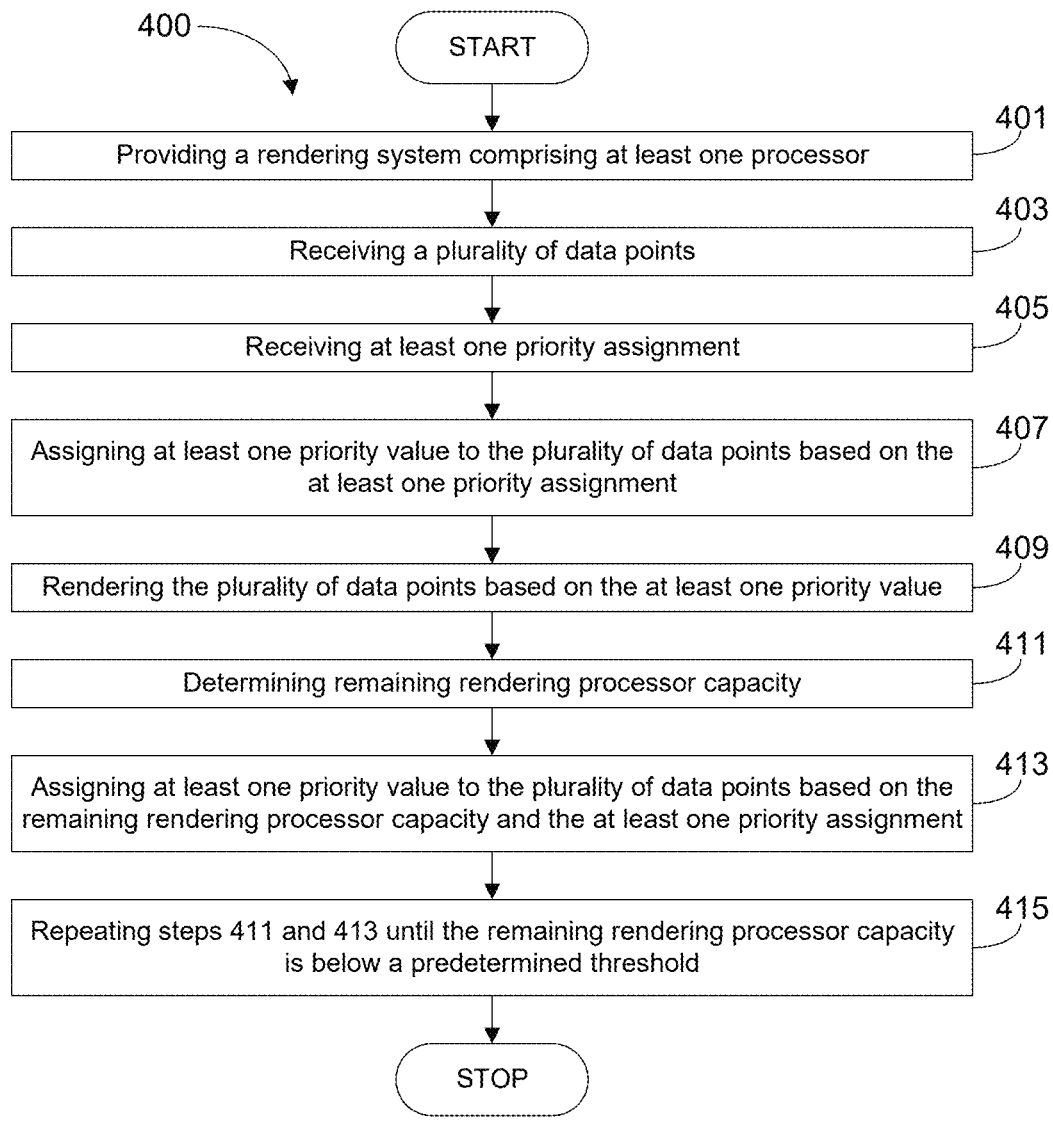
FIG. 4 shows an exemplary method of rendering point clouds.

FIG. 4 shows an exemplary method 400 for rendering a point cloud. At step 401, providing a rendering system comprising at least one processor. At step 403, receiving a plurality of data points. At step 405, receiving at least one priority assignment. At step 407, assigning at least one priority value to the plurality of data points based on the at least one priority assignment. At step 409, rendering the plurality of data points based on the at least one priority value. At step 411, determining remaining rendering processor capacity, At step 413, assigning at least one priority value to the plurality of data points based on the remaining rendering processor capacity and the at least one priority assignment. At step 415, repeating steps 411 and 413 until the remaining rendering processor capacity is below a predetermined threshold.

Although the invention has been described in detail with reference to certain preferred embodiments, variations and modifications exist within the spirit and scope of the invention as described and defined in the following claims.

The invention claimed is:

1. A rendering system comprising at least one rendering processor configured to:
   receive a plurality of data points in a point cloud, each of the plurality of data points represented by positional and color data;
   render all the plurality of data points if rendering processing capacity is sufficient;
   receive at least one priority assignment comprising a distance from a user and angle from the user's line of sight;
   assign at least one priority value to each of the plurality of data points based on the at least one priority assignment;
   if rendering processing capacity is insufficient, then render the plurality of data points based on the at least one priority value; and
   while remaining rendering processor capacity is below a minimum processing capacity, repeating the steps of:

determining the remaining rendering processor capacity;

readjusting at least one priority value to the plurality of data points based on the remaining rendering processor capacity and the at least one priority assignment; and rendering the plurality of data points based on the readjusted at least one priority value.

2. The rendering system of claim 1, wherein the at least one priority assignment further comprises at least one object of interest.

3. The rendering system of claim 1, wherein the at least one priority assignment further comprises at least one location of interest.

4. The rendering system of claim 1, wherein the at least one priority assignment further comprises color contrast.

5. The rendering system of claim 1, wherein the at least one priority assignment further comprises brightness.

6. The rendering system of claim 1, further comprising a priority assignment source configured to transfer the at least one priority assignment to the at least one processor.

7. The rendering system of claim 1, wherein the priority assignment source comprises a safety system.

8. The rendering system of claim 7, wherein the safety system is configured to identify and generate features corresponding to hazards.

9. The rendering system of claim 8, wherein the hazards may be at least one of: likelihood of negative event occurring, severity of impact and difficulty of detection.

10. A method of rendering, comprising:

providing a rendering system comprising at least one rendering processor configured for executing computer instructions implementing the method of rendering including a priority algorithm and a rendering algorithm;

receiving a plurality of data points, each of the plurality of data points represented by positional and color data;

render all the plurality of data points if rendering processing capacity is sufficient;

receiving at least one priority assignment comprising a distance from a user and angle from the user's line of sight;

assigning at least one priority value to each of the plurality of data points based on the at least one priority assignment;

if rendering processing capacity is insufficient, then rendering the plurality of data points based on the at least one priority value; and while remaining rendering processor capacity is below a minimum processing capacity repeating the steps of:

determining the remaining rendering processor capacity;

readjusting at least one priority value to the plurality of data points based on the remaining rendering processor capacity and the at least one priority assignment; and rendering the plurality of data points based on the readjusted at least one priority value.

11. The method of rendering according to claim 10, wherein the rendering system further comprises:

a point cloud data source configured to send the plurality of data points to the rendering processor; and a priority assignment source configured to send the at least one priority assignment to the rendering processor.

12. The method of rendering according to claim 10, wherein the at least one priority assignment further comprises at least one of the following: an object of interest and a location of interest.

13. The method of rendering according to claim 10, wherein the at least one priority assignment further comprises at least one of: color contrast and brightness.

14. The method of rendering according to claim 10, further comprising a priority assignment source configured to transfer the at least one priority assignment to the at least one processor.

15. The method of rendering according to claim 14, wherein the priority assignment source comprises a safety system configured to identify and generate features corresponding to hazards.

16. The method of rendering according to claim 15, wherein the hazards may be at least one of: likelihood of negative event occurring, severity of impact and difficulty of detection.

* * * * *